April 10, 1945. T. W. KENYON 2,373,315
AUTOMATIC PILOT FOR AIRCRAFT
Filed May 22, 1940
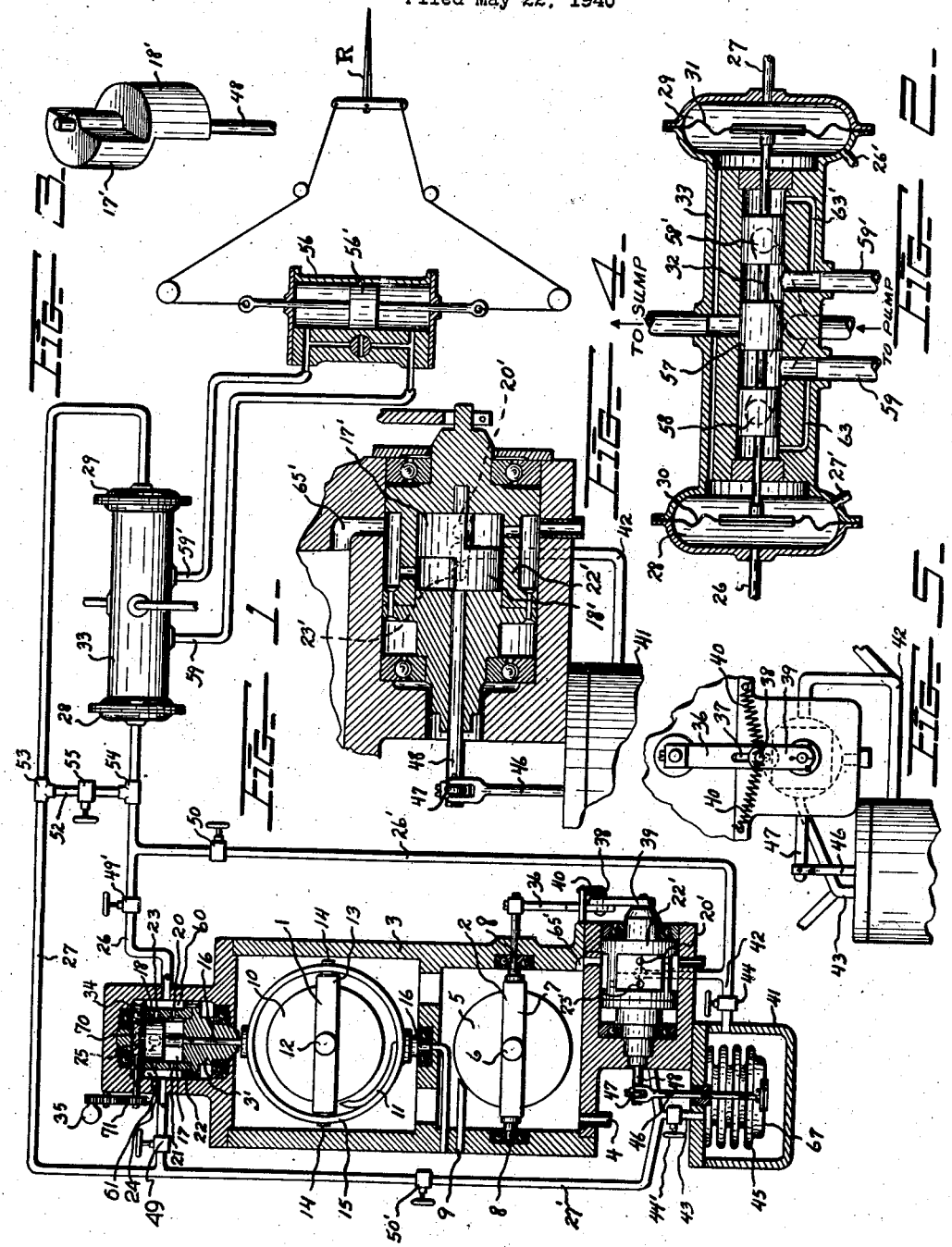
INVENTOR,
THEODORE W. KENYON,
BY
Herbert H. Thompson
HIS ATTORNEY.

Patented Apr. 10, 1945

2,373,315

UNITED STATES PATENT OFFICE 2,373,315

AUTOMATIC PILOT FOR AIRCRAFT

Theodore W. Kenyon, Huntington, N. Y., assignor to Sperry Gyroscope Company, Inc., Brooklyn, N. Y., a corporation of New York Application May 22, 1940, Serial No. 336,488

8 Claims. (Cl. 244—78)

This invention relates to automatic pilots especially adapted for aircraft, and more especially to the control of the rudder for azimuth steering. More particularly, the present invention is an improvement on the type of automatic pilot shown in the prior patent of Theodore W. Kenyon, the present inventor, and Stephen J. Zand, Serial No. 2,210,917, for Reactive servo system for automatic pilots, dated August 13, 1940. According to the system in this prior patent, the control of the rudder is effected jointly by a direction maintaining means such as a directional gyroscope, and by a rate of turn device such as a rate of turn gyroscope, both having pick-offs which jointly control a relay valve governing the rudder servomotor.

An object of the present invention is to effect a further improvement in this system by giving the automatic pilot a quicker and more positive action for sudden rapid yaws of the craft, i. e., when angular acceleration in azimuth is great, thereby enabling the craft to hold the course with a greater degree of accuracy. To effect this purpose, I have placed an auxiliary control element operative on the pick-off from the rate gyroscope and which introduces a follow-up or shut-off means for said pick-off which is out of phase with the primary impulse, by an amount roughly proportional to the rate of precession of the rate gyroscope. Therefore, for slow precessional movements of the gyroscope the follow-up is close and the final signal a minimum, but for more rapid precessional movements the follow-up is delayed, giving a greater signal. In other words, when the rate of turn is changing rapidly, i. e., when the craft has a large angular acceleration, my device has the least effect in reducing the signal and therefore the final signal may be said to be responsive, in general, to angular acceleration of the craft as well as to rate of turn and displacement. It is obvious that my invention is also applicable to other types of automatic pilots than the particular form to which it is shown as applied.

Referring to the drawing,

Fig. 1 shows a diagrammatic view of my invention, shown in sectional elevation.

Fig. 2 is a longitudinal section through the relay valve which controls the rudder servomotor.

Fig. 3 is an enlarged perspective view of one of the pick-off valves operated by the gyroscopes.

Fig. 4 shows an enlarged longitudinal sectional view of the rate gyro pick-off mechanism.

Fig. 5 shows an elevational view of the rate gyro pick-off taken at right angles to Figures 1 and 4.

As shown diagrammatically in the drawing, both the direction maintaining instrument or directional gyroscope 1 and the rate of turn gyroscope 2 are mounted in a common enclosing casing 3, from which air is continuously exhausted through pipe 4 for spinning the rotors of both gyroscopes and for operating the pick-offs. The rotor 5 of the rate gyroscope is shown as mounted on a normally horizontal spinning axis 6 in ring 7, which in turn is journaled on horizontal trunnions 8, 8 in casing 3. The spinning jet is shown at 9. The rotor 10 of the directional gyroscope is shown as spun from the spinning jet 11 and is mounted for rotation on a normally horizontal spin axis 12 in bearing ring 13, which in turn is journaled on horizontal axis 14, 14 in vertical ring 15. The ring 15, in turn, is journaled for rotation about a vertical axis by means of trunnions 16, 16 journaled in the outer frame or casing 3.

The pick-off on the directional gyroscope is shown of the double acting differential air-flow type similar to that disclosed in the copending application of William M. Harcum, Serial No. 211,307, for Air pick-off for sensitive instruments, filed June 1, 1938. According to this system, a cylindrical cut-off valve is mounted on the stem or trunnion 16 rising from the vertical ring, said valve having two complementary port cylinders 17 and 18 (Figs. 1 and 3). Cut-off cylinder 17 cooperates with the main pick-off ports 20 and 21 in the rotatable sleeve 22, while the other cylindrical portion 18 cooperates with the bleed ports 23 and 24 in said sleeve. In the normal or balanced position, the opposite edges of the cylindrical sections 17 and 18 bisect or equally cover all four ports 20, 21, 23 and 24, as more fully explained in the aforesaid application 211,307. Upon relative turning of said valve and its housing, however, the ports are unequally covered, resulting in differential pressure in the two pipes 26 and 27. To this end, air is continuously exhausted from the lower portion of the chamber within said sleeve 22 through a passage (not shown) connecting it with the evacuated interior of casing 3. The upper end of said chamber is connected through a small bore pipe 25 to the atmosphere. Pipes 26 and 27 lead from the respective pairs of ports through suitable channels 60, 61 in housing 3' to chambers or cylinders 28 and 29, containing pistons or diaphragms 30 and 31 connected to the valve stem 32 of a relay valve 33. For changing course, I have shown a worm wheel 34 for rotating the ported sleeve 22, said worm wheel being shown as rotated from course change knob 35, which rotates worm 70 through gears 71.

A similar pick-off may be provided for the rate of turn gyroscope. In this case, however, one of the trunion shafts 8 of the rate of turn gyroscope is connected to rotate the sleeve or housing 22' of the double valve 17', 18' instead of rotating the valve itself. To this end, I have shown secured to one trunnion 8 a crank 36 having a slot 37 engaged by a pin 38 on an arm 39 projecting from the sleeve 22', the same being centralized by tension springs 40 which operate also to centralize and oppose precession of the rate gyroscope. Said sleeve 22' has ports similar to the sleeve 22, which cooperate with the two portions of the double valve to create differential pressure in the pipes 26' and 27'. Said pipes may either be connected into the same chamber or cylinder as are pipes 26 and 27, as shown in Fig. 1, or they may be connected into separated chambers, as shown in Fig. 2, in both instances to combine the two differential pressure signals. In the form shown in Fig. 1, in which the signals from the two gyroscopes enter a common chamber or common chambers, the total signal is approximately the average of the two. In the form shown in Fig. 2, on the other hand, the total signal is the algebraic sum of the two and therefore gives a greater range of control and therefore greater sensitivity.

In order to secure the desired greater signal for rapid yaws, which are invariably accompanied by large angular acceleration, I have shown an auxiliary relay device 41 connected through pipes 42 and 43 having variable restrictions 44 and 44' therein, to the pipes 26' and 27'. Said device is shown as a metallic self-centralizing bellows 45 within the housing 41, the interior of the bellows being connected to one pipe 43 and the exterior of the bellows, which lies within the casing 41, is connected to the pipe 42. The movable wall 67 of the bellows is shown as connected through a rod 46 to a crank 47 on the stem 48 of the compound valve 17', 18', so as to turn the same normally in the same direction as the valve housing, thereby acting as a delayed action follow-up device. For very slow changes in the rate of yaw of the ship, that is, for slow precessional movements of the gyroscope, therefore, the restrictions 44 and 44' will have little effect and the valve position will closely follow that of the sleeve, and therefore the action of the rate gyroscope will be rendered a minimum. For rapid changes of rate, which of course always occur with sudden yaws of the ship and are accompanied by high angular acceleration, a large delay in the follow-up action will be secured and therefore the effect of the rate gyroscope signal becomes a maximum. By employing my device, therefore, I may increase the normal strength of the rate gyro signal as compared to the normal signal received from the directional gyroscope by suitably adjusting the valves 49, 49' and 50, 50', since for slow uniform turns of the ship, the rate gyro signal is greatly reduced by my invention, so as to become inconsequential. Therefore, a much quicker movement of the rudder may be obtained to correct sudden, violent yaws, without sacrificing accurate close control under normal conditions, such as occur during command turns which usually take place at a uniform, predetermined rate.

As a further means for improving the overall sensitivity of the device, I may insert a bypass connection 52 between the pipes 26 and 27 leading directly to the chambers 28 and 29. By inserting a variable needle valve 55 in said bypass, I may readily regulate the rate of change of differential pressures and, to some extent, the total differential pressure that may be exerted on the piston diaphragms 30 and 31 within the chambers, as will be readily apparent when the action of relay 33 is analysed, as explained more fully in said prior Patent 2,210,917.

In this relay system, the slide valve 32 of relay 33 is provided with a plurality of pistons 57, 58 and 58', the backs of the pistons 58 and 58' being also subject to the effective oil pressure supplied to the servomotor through the pipes 59 and 59'. This is accomplished by bypass connections 63 and 63' between the ports connected to pipes 59 and 59' and a space in the cylinder back of each piston. Therefore when an air signal is received of predetermined pressure, the piston valve 32 will move to cause flow of pressure oil to the servo cylinder until the pressure therein which is reflected back to oppose the air signal equals the force supplied by the air signal. It is, of course, understood that the actual pressure per unit area of the air signal is much smaller than the oil pressure per unit area in accordance with the ratio between the area of the diaphragms 30 and 31 and the area of the piston valves 58 and 58'. In this type of pilot, the oil pressure supplied to the servomotor 56 controlling the rudder R is at all times proportional to the effective differential air pressure within the chambers 28 and 29. Therefore, when this air pressure is varied, the effective operating oil pressure is also changed and hence the amount of rudder movement may be regulated at will, since in this system the rudder moves until the back pressure or force supplied by the air thereon equals the force supplied by the oil to the servomotor piston 56'. Therefore, in my invention, no oil throttle or special valves or pressure reducing bypass valve in the oil lines need be employed, the amount of rudder throw being regulated by the several air valves described, and especially by the valve 55.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. The combination in an automatic pilot for dirigible craft of, a standard of position, a differential pick-off therefor producing a first signal pressure, a rate of turn gyroscope, a differential pressure pick-off therefor producing a second signal pressure, a differential pressure device responsive to change in said second signal pressure operable to slowly restore the pick-off for the rate gyroscope to a normal position, means combining said controlled second signal and first signal, and relay means responsive to the controlled second signal and first signal and operated by the combined signals for controlling the craft.

2. In an automatic pilot for dirigible craft, a standard of position, a differential pressure signal producing means thereat, a rate of turn gyroscope, a differential pressure signal producing means thereat, means inversely responsive to the rate of precession of said rate of turn gyroscope for reducing the signal of the second-named signal producing means, means for combining the controlled signal produced by the second signal producing means and the signal produced by the first signal producing means, and means responsive to the combined signals for controlling the craft.

3. The combination in an automatic pilot for dirigible craft of, a standard of position, a differential pressure pick-off therefor producing a first signal pressure, a rate of turn gyroscope, a differential pressure pick-off therefor producing a second signal pressure, means for increasing said second signal to greater degrees as the rate of turn of said craft increases, means for combining said first and second signal pressures, a pressure responsive relay valve controlled by the combined signal pressures, and a servomotor controlled by said relay valve.

4. The combination in an automatic pilot for dirigible craft of, a standard of position, a differential pick-off therefor producing a first signal pressure responsive to the amount of course change, a rate of turn gyroscope, a differential pressure pick-off therefor producing a second signal pressure, a differential pressure device responsive to change in said second signal pressure operable to slowly restore the pick-off for the rate gyroscope to a normal position thereby superimposing an angular acceleration factor upon the angular rate factor, means combining said controlled second signal and first signal, and relay means, operated by the combined signals for controlling the craft in accordance with the angle of departure from course, and angular acceleration.

5. In an automatic pilot for dirigible craft, a standard of position, a rate-of-turn gyroscope, a pair of differential pressure pick-offs operatively associated respectively with said standard of position and said gyroscope, means for returning the pick-off associated with the gyroscope to its balanced position, means for retarding the action of said means to greater degrees as the rate of turn of said craft increases, pressure-responsive means for controlling said craft, and means for supplying the pressure signals supplied by said two pick-offs to said pressure-responsive means.

6. In an automatic pilot for dirigible craft, a standard of position, signal-producing means associated therewith for supplying a signal dependent in magnitude upon the amount of disagreement between said craft and said standard of position, signal-modifying means operable in response to rate of change of the rate of turn of said craft producing a signal varying with the angular acceleration of turn, and means responsive to the modified signal for controlling the craft, whereby immediately to supply a relatively large position-restoring control signal for sudden turns or yawing of the craft, which decays as the rate of turn becomes constant.

7. In an automatic pilot for dirigible craft, a standard of position, a rate-of-turn gyroscope, a pair of differential pressure controls operatively associated respectively with said standard of position and said gyroscope for providing a resultant differential pressure signal, means operable in response to turning of said gyroscope to move the control associated therewith toward a non-signal-affecting position, means for retarding the action of said means to greater degrees as the rate of turn of said craft increases, and means responsive to the resultant pressure signal for controlling the craft.

8. In an automatic pilot for dirigible craft, a standard of position, a rate-of-turn responsive device, a pair of differential pressure controls each comprising a pick-off operatively associated respectively with said standard of position and said device for providing a resultant differential pressure signal, means for returning the pick-off associated with said device to its balanced position, means for retarding the action of said means to greater degrees as the rate of turn of said craft increases, and means responsive to the resultant pressure signal for controlling the craft.

THEODORE W. KENYON.